United States Patent
Malischewski et al.

(10) Patent No.: US 9,863,529 B2
(45) Date of Patent: Jan. 9, 2018

(54) METHOD FOR CONTROLLING A SHIFT PROCESS OF AN AUTOMATIC GEARBOX AND CONTROLLER

(71) Applicant: MAN Truck & Bus AG, München (DE)

(72) Inventors: Thomas Malischewski, Heilsbronn (DE); Andreas Sommermann, Heilsbronn (DE)

(73) Assignee: MAN TRUCK & BUS AG, Munich (DE)

(\*) Notice: Subject to any disclaimer, the term of this patent is extended or adjusted under 35 U.S.C. 154(b) by 287 days.

(21) Appl. No.: 14/845,632

(22) Filed: Sep. 4, 2015

(65) Prior Publication Data

US 2016/0076640 A1   Mar. 17, 2016

(30) Foreign Application Priority Data

Sep. 12, 2014   (DE) .................. 10 2014 013 286

(51) Int. Cl.
  *F16H 61/02*   (2006.01)
  *F16H 59/78*   (2006.01)
  *F16H 61/00*   (2006.01)

(52) U.S. Cl.
  CPC ......... *F16H 61/0213* (2013.01); *F16H 59/78* (2013.01); *F16H 2061/0015* (2013.01); *F16H 2061/022* (2013.01); *F16H 2061/0216* (2013.01); *F16H 2061/0232* (2013.01)

(58) Field of Classification Search
  CPC .................. F16H 59/78; F16H 61/0213; F16H 2061/0015; F16H 2061/0216; F16H 2061/022; F16H 2061/0232
  See application file for complete search history.

(56) References Cited

U.S. PATENT DOCUMENTS

| 5,315,897 A | * | 5/1994 | Abe .................. B60W 10/06 123/333 |
| 6,059,689 A | * | 5/2000 | Shimizu .............. F16H 61/0213 477/98 |
| 6,456,919 B1 | | 9/2002 | Körner et al. |
| 6,473,680 B2 | | 10/2002 | Nishimura |

FOREIGN PATENT DOCUMENTS

| DE | 19854254 A1 | 5/2000 |
| DE | 60102962 T2 | 4/2005 |
| DE | 102005050479 A1 | 5/2007 |

\* cited by examiner

*Primary Examiner* — Edwin A Young
(74) *Attorney, Agent, or Firm* — Lucas & Mercanti, LLP

(57) ABSTRACT

A method for controlling a shift process of an automatic gearbox for a vehicle with an internal combustion engine as its engine, including specifying a shift strategy in a controller, by continuously predictively determining the behaviour of the engine following any shift process into a target gear on the basis of a current detected vehicle dynamic value, a current detected vehicle specific actual value, and/or a current detected engine specific actual value. The prediction results are taken into account and adapted shift thresholds are determined and specified as upshift thresholds or downshift thresholds for a fuel efficient shift. A control command for a corresponding automatic shift process is output after exceeding a shift threshold. The current temperature of at least one component of the engine exhaust system is taken into account during the specification of an adapted shift threshold.

9 Claims, 1 Drawing Sheet

METHOD FOR CONTROLLING A SHIFT PROCESS OF AN AUTOMATIC GEARBOX AND CONTROLLER

CROSS-REFERENCE TO RELATED APPLICATIONS

The present application claims priority of DE 10 2014 013 286.2, filed Sep. 12, 2014, which is incorporated herein by reference.

BACKGROUND OF THE INVENTION

The invention relates to a method for controlling a shift process of an automatic gearbox in a vehicle with an internal combustion engine as the engine, a controller for carrying out the method as well as a vehicle.

In order to reduce the load on a driver, in particular of large commercial vehicles, it is generally known to fit the vehicle with an automatic gearbox. With this, a target gear of the gearbox is determined depending on diverse parameters and a shift command is automatically carried out on reaching specified shift conditions. The criterion for such an automatic shift process is in particular the most fuel efficient possible operation of the vehicle.

With a known method for controlling a shift process of an automatic gearbox in a vehicle with an internal combustion engine as the engine (DE 198 54 254 A 1), a shift strategy is specified in a controller, with which the behaviour of the engine following any shift process into a target gear is continuously determined in advance on the basis of current detected vehicle dynamic and/or vehicle specific and/or engine specific actual values. An engine revolution rate, an output revolution rate of the gearbox, an accelerator pedal position, a brake pedal position and a vehicle speed are used here as actual values for the calculation of such a prediction result.

Furthermore, an accelerator pedal speed, a current vehicle mass and a road gradient can be taken into account here. Taking account of said prediction results, adapted shift thresholds are determined and specified as upshift thresholds or downshift thresholds, in particular for a fuel efficient shift, wherein a control command for a corresponding automatic shift process is output after exceeding such a shift threshold. Specifically, basic limit revolution rate ranges, which are variable in terms of their limits and can be adapted to the respective current conditions, are specified as shift thresholds here.

As can be seen, the decision as to whether a shift process will be fuel efficient or not, and as a result whether any fuel savings can be achieved, depends on how accurately a predicted determination of the behaviour of the engine can be determined, in particular of a build-up of torque following any shift process into a target gear.

Furthermore, a control method for an automatic gearbox is known (DE 10 2005 050 479 A1), with which the behaviour of the engine with regard to the predicted engine revolution rate following a shift into a target gear is likewise predictively calculated prior to a shift process. Said calculated engine revolution rate is compared with a downshift threshold and an automatic upshift into the target gear will only be implemented in the event of exceeding such a downshift threshold. In a similar known control method (DE 601 02 962 T2), a precalculation of an engine revolution rate is likewise carried out for a possible target gear and an upshift process is only implemented if a maximum permissible engine revolution rate will not be exceeded thereby.

SUMMARY OF THE INVENTION

In view of the above-described prior art, it is the object of the invention to provide a method and a controller in which a predictive calculation can be extended as a step response of the engine during an automatic shift process into a target gear.

The object of the invention is met by a method in which the behaviour of the engine following a possible shift process into a target gear is continuously predictively determined by a controller on the basis of current detected vehicle dynamic and/or vehicle specific and/or engine specific actual values, wherein adapted shift thresholds are determined and specified as upshift thresholds or downshift thresholds, in particular for a fuel efficient shift, taking into account said prediction results, wherein a control command for a corresponding automatic shift process is output after exceeding a shift threshold. According to an embodiment of the invention, the current temperature of at least one component of the engine exhaust system is taken into account when specifying an adapted shift threshold. The current thermal state of the engine exhaust system, for example the thermal state of an exhaust turbine of a turbocharger, significantly influences the step response of the engine during a shift process. If such a thermal state is taken into account during the predictive calculation of the behaviour of the engine following a shift process into a target gear, the prediction result is more accurate and hence a decision for a fuel efficient shift process can be advantageously carried out accurately.

The relevant thermal state is, as already explained previously, preferably determined in relation to an exhaust turbine of an exhaust turbocharger, but can also alternatively or additionally be related to an exhaust manifold.

In a specific embodiment, the relevant temperature of an exhaust system component can be measured directly by means of one or a plurality of temperature sensors, wherein a current temperature signal is then fed to the controller. For such a temperature measurement there are known measurement methods with sensors in contact with the component or contactless measurements.

In an alternative embodiment or possibly in addition, for example for increasing the accuracy, the relevant temperature, in particular of an exhaust turbine, can be indirectly calculated from the load profile of the internal combustion engine prior to the shift process. In particular, the revolution rate and/or the charging pressure and/or the injection quantity and/or the air mass flow of the internal combustion engine are used for such a calculation.

With a specific implementation of the method, during the predictive determination of the behaviour of the internal combustion engine taking into account the current temperature of at least one component of the engine exhaust system, a build-up of torque is precalculated as a load step response of the internal combustion engine. It is preferably provided that a lower component temperature compared to a defined specified component temperature threshold value causes a slower build-up of torque with correspondingly less power of the internal combustion engine than would be the case for component temperatures corresponding to or higher than the defined specified component threshold temperature. This means that a relatively lower component temperature causes a slower build-up of torque with correspondingly less power of the internal combustion engine. During the specification of a shift threshold and the decision for a shift process, it is then taken into account whether the internal combustion engine will provide the necessary power for the current speed demand of the vehicle under the current temperature conditions, in particular on an exhaust turbine.

Furthermore, the object of the invention is met by a controller for carrying out the present method as well as a vehicle using such a controller, in particular a commercial vehicle.

The invention will be explained further using figures.

DETAILED DESCRIPTION OF THE PREFERRED EMBODIMENTS

Figure 1:
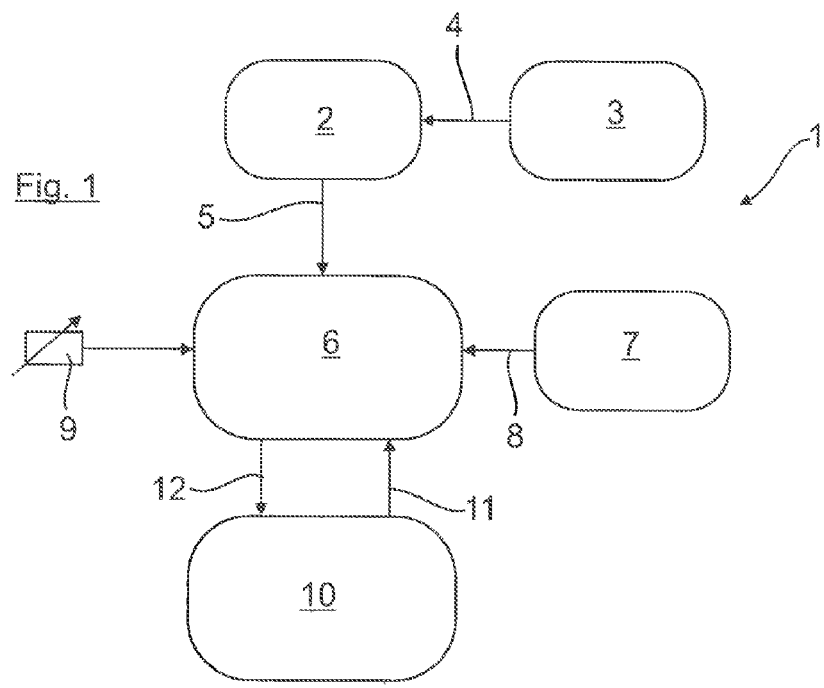
FIG. 1 shows a flow chart of a method for controlling a shift process of an automatic gearbox for a vehicle with an internal combustion engine as its engine.

A flow chart 1 for a method for controlling a shift process of an automatic gearbox for a vehicle with an internal combustion engine as its engine is shown in FIG. 1. For this the actual state of the engine is determined continuously in Block 2 by a controller, wherein recorded input variables are used for the calculation, as shown schematically with Block 3 and the input arrow 4. The recorded input variables are recorded by various sensors and the controller is, for example, a processor running a program. In particular the fuel feed and the air feed, the water temperature and possibly other recorded variables are used as input variables for this.

A precalculation of the build-up of torque for possible characteristic field points of a possible target gear is carried out in Block 6 based on the results of Block 2 (input arrow 5). In addition to the values for the actual state of the engine from Block 2, further input variables are used and are taken into account for this, as shown schematically with Block 7 and the input arrow 8. Block 7 represents schematically the input variables including charging pressure, revolution rate, injection quantity and air mass flow which are used in particular for indirect model calculation of the temperature of an exhaust turbine of an exhaust turbocharger and said temperature is taken into account in the precalculation of the build-up of torque.

Alternatively or additionally, such a temperature can also be directly measured with at least one temperature sensor 9, whose measurement value is fed to Block 6 to be taken into account during the precalculation.

Block 10 schematically represents a gearbox controller, which may be integrated within an engine controller, and in which the decision is made as to whether a possible shift process will be fuel efficient and should be carried out or omitted. For this purpose, the gearbox controller corresponding to Block 10 interrogates Block 6 for the precalculation results, as shown schematically with query arrow 11. Accordingly, the precalculation result from Block 6 is output to the gearbox controller of Block 10, as shown schematically by the transmission arrow 12.

Figure 2:
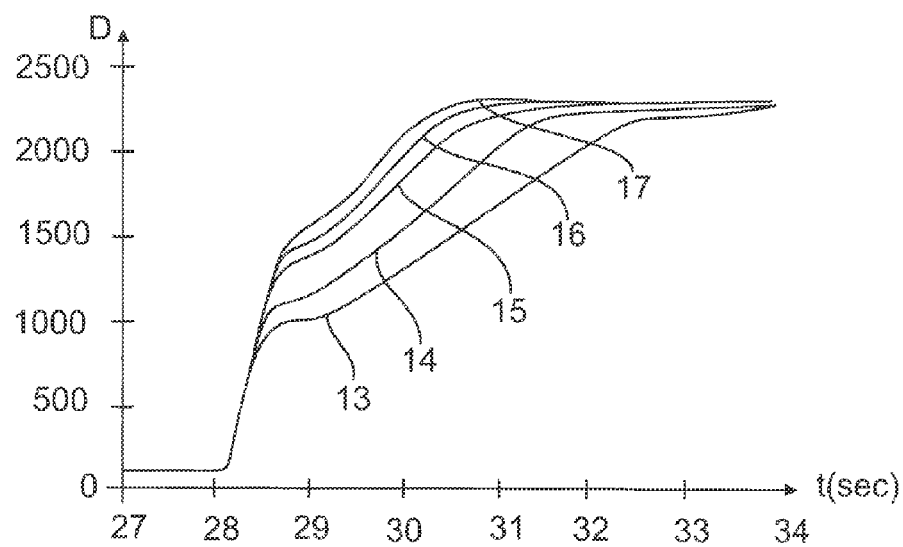
FIG. 2 shows a load step diagram for a build-up of torque following a shift process as a function of an exhaust turbine temperature.

In FIG. 2 the step response of an engine following a shift process is shown in relation to a build-up of torque by way of example. For this purpose the torque is shown qualitatively towards the top and the time profile in seconds is shown towards the right in a coordinate system:

The five graphs shown correspond by way of example to a load step response of an engine during a shift process at a revolution rate of 1200 revolutions per minute. A thermal model of an exhaust turbine is integrated within the engine controller and relies on measurement variables or computed variables of the engine controller.

The model provides a temperature, using which the load step response of the engine can be described/calculated according to FIG. 2.

In the diagram according to FIG. 2, the bottom graph 13 corresponds to a temperature of the exhaust turbine of 140° C. and, moving up, graph 14 corresponds to a temperature of 300° C., graph 15 to a temperature of 400° C., graph 16 to a temperature of 460° C. and the topmost graph 17 to a temperature of 500° C.

It can be clearly seen from the diagram that the step response of the engine depends significantly on the thermal state of the exhaust turbine, wherein a colder exhaust turbine causes a slower build-up of torque following a shift process. Said dependency is determined according to the invention and is taken into account when making the decision for a possible shift process.

| Reference character list |
| --- |
| 1 flow chart |
| 2 block |
| 3 block |
| 4 input arrow |
| 5 input arrow |
| 6 block |
| 7 block |
| 8 input arrow |
| 9 temperature sensor |
| 10 block |
| 11 query arrow |
| 12 transmission arrow |
| 13 bottom graph |
| 14 graph |
| 15 graph |
| 16 graph |
| 17 top graph |

The invention claimed is:

1. A method for controlling a shift process of an automatic gearbox in a vehicle with an internal combustion engine as its engine, comprising the steps of:
   specifying, by a controller, a shift strategy by continuously predictively determining a behavior of the engine following any shift process into a target gear based on at least one of current detected vehicle dynamic, vehicle specific actual values, and engine specific actual values;
   determining adapted shift thresholds as upshift thresholds or downshift thresholds taking into account the predictively determined behaviour for a fuel efficient shift and a current temperature of at least one component of an engine exhaust system; and
   outputting, after exceeding one of the shift thresholds, a control command for a corresponding automatic shift process.

2. The method according to claim 1, wherein the at least one component of the exhaust system is at least one of an exhaust turbine of an exhaust turbocharger and an exhaust manifold.

3. The method according to claim 1, further comprising the steps of directly measuring the current temperature by at least one temperature sensor and sending a current temperature signal to the controller.

4. The method according to claim 1, further comprising the step of indirectly calculating the current temperature from a load profile of the internal combustion engine.

5. The method according to claim 4, wherein the step of indirectly calculating uses at least one of a revolution rate, a charging pressure, an injection quantity, and an air mass flow of the internal combustion engine.

6. The method according to claim 1, further comprising the step of precalculating a build-up of torque as a load step response of the internal combustion engine following a shift process during the step of predictively determining the behaviour of the internal combustion engine.

7. The method according to claim 6, wherein a lower component temperature compared to a defined specified component temperature threshold value causes a slower build-up of torque with correspondingly less power of the internal combustion engine than is the case for component temperatures corresponding to or higher than the defined specified component threshold temperature, and the build-up of torque associated with the current temperature is taken into account during the step of specifying a shift threshold and when making a decision for a shift process whether a necessary power for a current speed demand of the vehicle will be available for the current temperature conditions of the internal combustion engine.

8. A controller storing a computer executable program for carrying out a method for controlling a shift process of an automatic gearbox in a vehicle with an internal combustion engine as its engine, the program comprising steps executable by the controller for:
  specifying a shift strategy by continuously predictively determining a behavior of the engine following any shift process into a target gear based on at least one of current detected vehicle dynamic, vehicle specific actual values, and engine specific actual values;
  determining adapted shift thresholds as upshift thresholds or downshift thresholds taking into account the predictively determined behaviour for a fuel efficient shift and a current temperature of at least one component of an engine exhaust system; and
  outputting, after exceeding one of the shift thresholds, a control command for a corresponding automatic shift process.

9. A vehicle with an automatic gearbox, an internal combustion engine, and a controller the controller storing a computer executable program for carrying out a method for controlling a shift process of the automatic gearbox, the program comprising steps executable by the controller for:
  specifying a shift strategy by continuously predictively determining a behavior of the engine following any shift process into a target gear based on at least one of current detected vehicle dynamic, vehicle specific actual values, and engine specific actual values;
  determining adapted shift thresholds as upshift thresholds or downshift thresholds taking into account the predictively determined behaviour for a fuel efficient shift and a current temperature of at least one component of an engine exhaust system; and
  outputting, after exceeding one of the shift thresholds, a control command for a corresponding automatic shift process.

* * * * *